(12) United States Patent
Tang et al.

(10) Patent No.: US 7,518,495 B2
(45) Date of Patent: Apr. 14, 2009

(54) UNIVERSAL TIRE PRESSURE MONITOR

(75) Inventors: Tom Tang, Novi, MI (US); John Nantz, Brighton, MI (US); Riad Ghabra, Dearborn Heights, MI (US); Thomas LeMense, Farmington, MI (US); Ronald King, Brownstown, MI (US); Jan Supronowicz, Dearborn, MI (US)

(73) Assignee: Lear Corporation, Southfield, MI (US)

(*) Notice: Subject to any disclaimer, the term of this patent is extended or adjusted under 35 U.S.C. 154(b) by 641 days.

(21) Appl. No.: 10/716,121

(22) Filed: Nov. 18, 2003

(65) Prior Publication Data

US 2005/0104722 A1 May 19, 2005

(51) Int. Cl.
*B60C 23/00* (2006.01)
(52) U.S. Cl. .................. 340/445; 340/442; 340/447; 73/146.2
(58) Field of Classification Search ............ 340/445, 340/442, 447; 73/146.2
See application file for complete search history.

(56) References Cited

U.S. PATENT DOCUMENTS

| | | | |
|---|---|---|---|
| 4,742,857 A | 5/1988 | Gandhi | |
| 5,600,301 A | 2/1997 | Robinson, III | |
| 5,602,524 A | 2/1997 | Mock et al. | |
| 5,661,651 A | 8/1997 | Geschke et al. | |
| 5,663,496 A | 9/1997 | Handfield et al. | |
| 5,731,516 A | 3/1998 | Handfield et al. | |
| 5,741,966 A | 4/1998 | Handfield et al. | |
| 5,838,229 A | 11/1998 | Robinson, III | |
| 5,844,131 A | 12/1998 | Gabelmann et al. | |
| 5,880,363 A | 3/1999 | Meyer et al. | |
| 5,883,305 A | 3/1999 | Jo et al. | |
| 5,900,808 A | 5/1999 | Lebo | |
| 5,926,087 A | 7/1999 | Busch et al. | |
| 5,963,128 A | 10/1999 | McClelland | |
| 5,965,808 A | 10/1999 | Normann et al. | |
| 6,018,993 A | 2/2000 | Normann et al. | |
| 6,021,319 A | 2/2000 | Tigwell | |
| 6,034,597 A | 3/2000 | Normann et al. | |
| 6,087,930 A * | 7/2000 | Kulka et al. ............. 340/447 |
| 6,112,165 A | 8/2000 | Uhl et al. | |
| 6,124,786 A | 9/2000 | Normann et al. | |
| 6,155,119 A | 12/2000 | Normann et al. | |

(Continued)

FOREIGN PATENT DOCUMENTS

DE          19503756          8/1996

(Continued)

OTHER PUBLICATIONS

German Office Action dated Sep. 17, 2007.

*Primary Examiner*—Daryl C Pope
(74) *Attorney, Agent, or Firm*—Brooks Kushman P.C.

(57) ABSTRACT

A universal monitor to be mounted in a tire of a vehicle, the monitor for use in a remote tire pressure monitoring system for the vehicle. The monitor includes a sensor for sensing tire pressure, and a storage device for storing a plurality of codes, each code comprising at least a data format. The monitor also includes a transmitter in communication with the sensor and the storage device, the transmitter for transmitting a wireless signal including data representing the sensed tire pressure. The wireless signal is transmitted by the transmitter according to at least one of the stored plurality of codes.

52 Claims, 1 Drawing Sheet

U.S. PATENT DOCUMENTS

| | | |
|---|---|---|
| 6,169,480 B1 | 1/2001 | Uhl et al. |
| 6,181,241 B1 | 1/2001 | Normann et al. |
| 6,192,747 B1 | 2/2001 | Fennel |
| 6,194,999 B1 | 2/2001 | Uhl et al. |
| 6,204,758 B1 | 3/2001 | Wacker et al. |
| 6,259,361 B1 | 7/2001 | Robillard et al. |
| 6,362,731 B1 | 3/2002 | Lill |
| 6,369,703 B1 | 4/2002 | Lill |
| 6,445,286 B1 | 9/2002 | Kessler et al. |
| 6,446,502 B1 | 9/2002 | Normann et al. |
| 6,489,888 B1 | 12/2002 | Honeck et al. |
| 6,622,552 B1 | 9/2003 | Delaporte |
| 6,633,229 B1 | 10/2003 | Normann et al. |
| 6,667,687 B1 | 12/2003 | DeZorzi |
| 6,681,164 B2 | 1/2004 | Bergerhoff et al. |
| 6,705,155 B2 | 3/2004 | Katou |
| 6,710,708 B2 | 3/2004 | McClelland et al. |
| 6,794,993 B1 | 9/2004 | Kessler et al. |
| 6,801,872 B2 | 10/2004 | Normann et al. |
| 6,828,905 B2 | 12/2004 | Normann et al. |
| 6,871,157 B2 | 3/2005 | Lefaure |
| 6,879,252 B2 | 4/2005 | DeZorzi et al. |
| 6,885,292 B2 | 4/2005 | Katou |
| 6,888,471 B2 | 5/2005 | Elsner et al. |
| 6,897,770 B2 | 5/2005 | Lill |
| 6,906,624 B2 | 6/2005 | McClelland et al. |
| 6,914,523 B2 | 7/2005 | Munch et al. |
| 6,922,140 B2 | 7/2005 | Hernando et al. |
| 6,972,671 B2 | 12/2005 | Normann et al. |
| 6,983,649 B2 | 1/2006 | Katou |
| 7,010,968 B2 | 3/2006 | Stewart et al. |
| 7,015,801 B1 | 3/2006 | Juzswik |
| 7,017,403 B2 | 3/2006 | Normann et al. |
| 7,039,397 B2 | 5/2006 | Chuey |
| 7,042,348 B2 | 5/2006 | Schulze et al. |
| 7,050,794 B2 | 5/2006 | Chuey et al. |
| 7,084,749 B1 | 8/2006 | Honeck et al. |
| 7,084,751 B2 | 8/2006 | Klamer |
| 7,088,226 B2 | 8/2006 | McClelland et al. |
| 7,148,793 B2 | 12/2006 | Lin |
| 7,161,466 B2 | 1/2007 | Chuey |
| 7,254,994 B2 | 8/2007 | Schulze |
| 2002/0059825 A1 | 5/2002 | Lundqvist |
| 2002/0075145 A1 | 6/2002 | Hardman et al. |
| 2002/0168795 A1 | 11/2002 | Schuurmans |
| 2002/0190852 A1 | 12/2002 | Lin |
| 2003/0079537 A1 | 5/2003 | Luce |
| 2003/0110851 A1 | 6/2003 | Tsujita |
| 2003/0197595 A1 | 10/2003 | Olson et al. |
| 2004/0172179 A1 | 9/2004 | Miwa |
| 2004/0203370 A1 | 10/2004 | Luo et al. |
| 2006/0001535 A1 | 1/2006 | Hafele et al. |
| 2006/0006992 A1 | 1/2006 | Daiss et al. |
| 2006/0012475 A1 | 1/2006 | Froitzheim et al. |
| 2006/0022813 A1 | 2/2006 | Schulze et al. |
| 2006/0044125 A1 | 3/2006 | Pierbon |
| 2006/0148456 A1 | 7/2006 | Chuey |
| 2006/0161327 A1 | 7/2006 | Emmerich et al. |
| 2006/0192661 A1 | 8/2006 | Geradiere |
| 2006/0217850 A1 | 9/2006 | Geerlings et al. |
| 2006/0235641 A1 | 10/2006 | Fink et al. |
| 2006/0273889 A1 | 12/2006 | Schulze et al. |
| 2007/0063814 A1 | 3/2007 | Olson et al. |
| 2007/0176736 A1 | 8/2007 | Chuey et al. |
| 2007/0190993 A1 | 8/2007 | Chuey et al. |

FOREIGN PATENT DOCUMENTS

| | | |
|---|---|---|
| DE | 19924830 | 11/2000 |
| EP | 1 352 763 | 12/2003 |
| GB | 2 387 032 | 10/2003 |
| WO | WO 99/08887 | 8/1997 |
| WO | WO 03/016079 | 2/2003 |

* cited by examiner

UNIVERSAL TIRE PRESSURE MONITOR

BACKGROUND OF THE INVENTION

1. Field of the Invention

The present invention relates to a universal monitor to be mounted in a tire of a vehicle, the monitor for use in a remote tire pressure monitoring system for the vehicle.

2. Background Art

It is well known in the automotive industry to provide vehicles with remote tire pressure monitoring (TPM) systems for monitoring tire pressure and other tire parameters. Such TPM systems typically include a tire monitor mounted in each vehicle tire for monitoring at least the pressure of the associated tire. Each tire monitor transmits wireless signals that includes data representing the tire pressure. The wireless signals, which are typically radio frequency (RF) signals, are transmitted from the monitors to a control module located on-board the vehicle. The tire pressure information delivered to the control module by the wireless signals from the monitors is subsequently conveyed to a vehicle operator or occupant, such as by a display.

Existing TPM systems are different from one manufacturer to the next, and may even be different within an individual manufacturer's platform. As a result, certain components, such as tire monitors, must be specially configured for use in a particular TPM system. In that regard, different manufacturers' codes are used to represent different TPM systems. A tire monitor configured for use in a particular TPM system has a manufacturer's code that may indicate a particular combinations of various characteristics, such as a carrier frequency, modulation scheme, data format and/or encryption technique to be used for the wireless signals in that particular TPM system.

Thus, there exists a need for a universal tire monitor for use in remote tire pressure monitoring systems. Such a universal monitor would reduce the need for installers and aftermarket providers to stock multiple tire monitors configured for different TPM systems. Instead, such installers and providers could replace multiple monitors with a single monitor that could be used with multiple TPM systems. Such a universal monitor would also reduces installation complexity since a single monitor and installation procedure could be used.

SUMMARY OF THE INVENTION

Accordingly, the present invention provides a universal tire pressure monitor for use in a remote tire pressure monitoring system for a vehicle.

According to one embodiment of the present invention, a universal monitor to be mounted in a tire of a vehicle is provided, the monitor for use in a remote tire pressure monitoring system for the vehicle. The monitor comprises a sensor for sensing tire pressure, and a storage device for storing a plurality of codes, each code comprising at least a data format. The monitor further comprises a transmitter in communication with the sensor and the storage device, the transmitter for transmitting a wireless signal including data representing the sensed tire pressure, wherein the wireless signal is transmitted by the transmitter according to at least one of the stored plurality of codes.

According to another embodiment of the present invention, a universal monitor to be mounted in a tire of a vehicle is provided, the monitor for use in a remote tire pressure monitoring system for the vehicle. The monitor comprises a sensor for sensing tire pressure, and a receiver for receiving a program signal, the program signal comprising one of a plurality of codes, each code comprising at least a data format. In this embodiment, the monitor further comprises a transmitter in communication with the sensor and for transmitting a wireless signal including data representing the sensed tire pressure, wherein the wireless signal is transmitted according to the one of the plurality of codes received by the receiver.

According to still another embodiment of the present invention, a universal monitor to be mounted in a tire of a vehicle is provided, the monitor for use in a remote tire pressure monitoring system for the vehicle. The monitor comprises a sensor for sensing tire pressure, and a storage device for storing a plurality of codes, each code comprising at least a data format. In this embodiment, the monitor further comprises a transmitter in communication with the sensor and the storage device, the transmitter for transmitting a series of wireless signals including data representing the sensed tire pressure, wherein each of the series of wireless signal is transmitted according to a different one of the stored plurality of codes.

The following detailed description and accompanying drawings set forth preferred embodiments of the present invention.

DETAILED DESCRIPTION OF THE PREFERRED EMBODIMENT(S)

Figure 1:
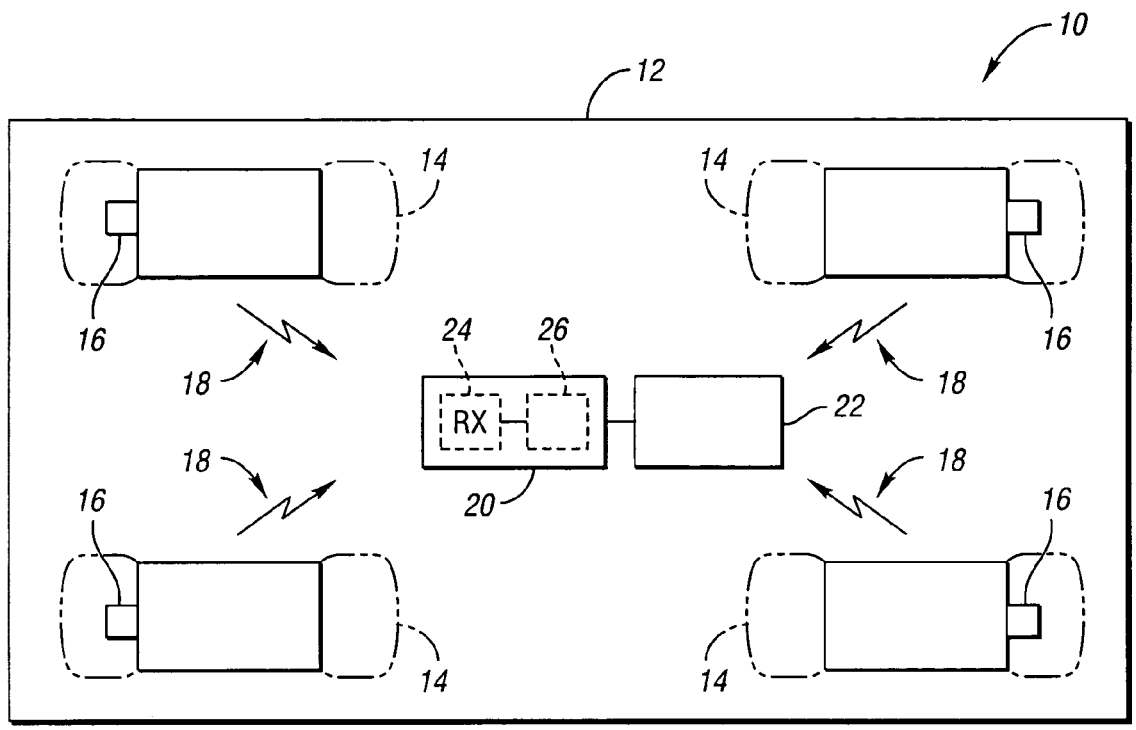
FIG. 1 is a simplified, representative block diagram of a remote tire pressure monitoring for use with the universal monitor of the present invention.

Referring now to FIG. 1, a simplified, representative block diagram of a remote tire pressure monitoring system is shown, denoted generally by reference numeral 10. As seen therein, the remote tire pressure monitoring system (10) is designed for use in a vehicle (12) having a plurality of tires (14). It should be noted that while the tire pressure monitoring system (10) is shown and described herein in conjunction with an automotive vehicle having four tires, such an environment is exemplary only. That is, tire pressure monitoring systems (10) are suitable for use in any type of vehicle having any number of tires.

The remote tire pressure monitoring system (10) includes a plurality of tire monitors (16). Each tire monitor (16) is provided for mounting in one of the plurality of tires (14). In that regard, each tire monitor (16) is preferably located inside the tire (14) adjacent the tire inflation valve stem (not shown), although any mounting location known in the art may be used. In general, each tire monitor (16) monitors at least the pressure of the associated tire (14), and transmits a wireless signal (18) that includes data representing the tire pressure. The wireless signals (18) are transmitted from the monitors (16) to a control module (20) located on-board the vehicle (12). The tire pressure information delivered to the control module (20) by the wireless signals (18) from the monitors (16) is subsequently conveyed to a vehicle operator or occupant (not shown), typically in the form of a display (22).

Still referring to FIG. 1, control module (20) typically includes a receiver (24) for receiving the wireless signals (18)

transmitted from monitors (16). Receiver (24) may comprise one or more antennae (not shown) located at one or more selected sites on the vehicle (12). Control module (20) also typically includes a controller (26) provided in communication with receiver (24). Controller (26) is for processing wireless signals (18) received by receiver (24) from monitors (16) and for generating information signals (not shown) for use in conveying at least tire pressure information to a vehicle operator, typically via display (22). Display (22) may be a monitor, LCD, LED display or a lighted icon in the vehicle instrument panel, dashboard or any vehicle console. It should be noted that information concerning other tire parameters, such as temperature, status and/or speed may also be conveyed to the vehicle operator. It should also be noted that the information may also be conveyed to the vehicle operator in an audible fashion, and may include a warning, which may also be audible, if tire pressure or other tire parameters, such as temperature, are outside recommended ranges.

Wireless signals (18) transmitted from tire monitors (16) typically comprise a radio frequency (RF) carrier signal modulated with a digital data word that represents at least a sensed, monitored or determined tire pressure, but which may also represent other tire parameters and/or information. A simple and common form of modulating the carrier signal is through on-off keying (OOK), where a binary "one" in the data word results in transmission of the carrier signal for the duration of the "one," and a binary "zero" in the data word results in no transmission of the carrier signal for the duration of the "zero."

Wireless signals (18) can be configured to operate at different carrier frequencies, and using different modulation schemes (e.g., on-off keying (OOK), frequency shift keying (FSK), or amplitude shift keying (ASK)). Wireless signals (18) can also be configured with different data formats (i.e., the number and location of the bits representing the sensed tire pressure and other information). Wireless signals (18) can still further be encrypted according to various techniques, and may also have additional or other characteristics than those described above. The combination of characteristics to be used for a particular wireless signal (18) may be referred to as a signal format.

As previously described, existing TPM systems are different from one manufacturer to the next, and may even be different within an individual manufacturer's platform. As a result, components such as tire monitors must be specially configured for use in a particular TPM system. In that regard, different manufacturers' codes are used to represent different TPM systems. A tire monitor configured for use in a particular TPM system has a manufacturer's code that may indicate a particular signal format with a particular combination of characteristics, such as a carrier frequency, modulation scheme, data format and/or encryption technique, to be used for the wireless signals in that particular TPM system.

Thus, as also previously described, there exists a need for a universal tire monitor for use in remote tire pressure monitoring systems. Such a universal monitor would reduce the need for installers and aftermarket providers to stock multiple tire monitors configured for different TPM systems. Instead, such installers and providers could replace multiple monitors with a single monitor that could be used with multiple TPM systems. Such a universal monitor would also reduces installation complexity since a single monitor and installation procedure could be used.

Figure 2:
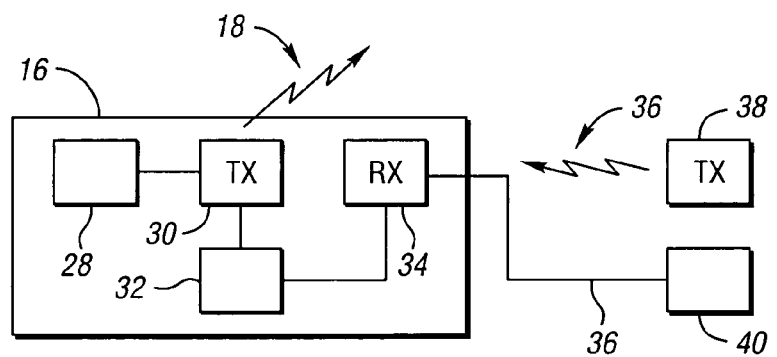
FIG. 2 is a simplified block diagram of embodiments of a universal monitor for use in a vehicle remote tire pressure monitoring system according to the present invention.

Referring now to FIG. 2, embodiments of the universal tire monitor of the present invention are shown, denoted generally by reference numeral 16. The universal monitor (16) is for use in a remote tire pressure monitoring system (10) of the type shown in FIG. 1. According to the universal monitor (16) of the present invention, an appropriate sensor (28) and/or other device is provided, for sensing, determining and/or monitoring at least the pressure of the associated tire (14). In that regard, monitor (16) may also be equipped to sense, determine and/or monitor any number of tire parameters in addition to pressure including, but not limited to, temperature, status (i.e., whether or not the tire is rotating) and/or speed, in any fashion known in the art.

A transmitter (TX) (30) is provided in communication with sensor (28) for transmitting wireless signals (18) representative of the sensed tire pressure. That is, wireless signals (18) include data representing the sensed tire pressure. In that regard, wireless signals (18) are preferably radio frequency (RF) signals, although other signal types known in the art can be employed. It should be noted that wireless signals (18) may also include data representative of information concerning any of a number of other tire parameters such as temperature, status and/or speed as sensed, measured and/or determined by an appropriately equipped tire monitor (16).

A controller (32) is provided in communication with transmitter (30) and with a receiver (34). Controller (32) preferably comprises a microprocessor, which preferably includes a storage device or memory, such as a read-only memory (ROM) and/or any type of random access memory (RAM). According to one embodiment of the present invention, controller (32) is for storing a plurality of manufacturers' codes. As previously described, in existing TPM systems, manufacturers' codes may be used to identify a signal format including any number of characteristics, such as carrier frequency, modulation scheme, data format and/or encryption technique, for wireless signals (18).

Referring still to FIG. 2, receiver (34) is for receiving a program signal (36). Program signal (36) is preferably a low frequency (LF) signal, such as in the range of approximately 125-135 kHz, transmitted from a remote LF transmitter (38). Receiver (34), program signal (36) and remote transmitter (38), however, could take other forms known in the art, such as RF. In that same regard, rather than a wireless configuration, receiver (34) could be provided as a port either on or in communication with controller (32) for receiving program signal (36) from an external interface (40) over a temporary wired connection.

In any event, program signal (36) is for use in selecting one of the plurality of manufacturers' codes according to which wireless signal (18) will be transmitted by transmitter (30). That is, prior to or upon installation of monitor (16) in a vehicle tire, program signal (36) is sent to receiver (34), such as by a technician, either via remote transmitter (38) or external interface (40). In this embodiment, program signal (36) includes a command for use by controller (32) to select one of the plurality of stored manufacturers' codes.

Subsequently, during operation of the TPM system, controller (32) controls transmitter (30) to transmit wireless signal (18) according to the signal format indicated by the selected manufacturers' code. As previously described, signal formats for wireless signal (18) may include characteristics such as carrier frequency, modulation scheme, data format, encryption technique and/or other characteristics. In that regard, with reference again to FIG. 1, receiver (24) for onboard controller (20) is configured to receive wireless signals (18) having the signal format of the selected one of the plurality of manufacturers' codes. Controller (26) of control module (20) then conveys at least tire pressure information to a vehicle occupant via display (22).

Alternatively, rather than storing a plurality of manufacturers' codes, controller (32) may be used to store a particular manufacturer's code received via program signal (36). In that regard, controller (32) may store a base code, and a program signal (36) sent to receiver (34), such as by a technician via remote transmitter (38) or external interface (40), includes a particular manufacturers' code for storage by controller (32). Subsequently, during operation of the TPM system, controller (32) controls transmitter (30) to transmit wireless signal (18) according to the signal format indicated by the particular manufacturers' code. With reference again to FIG. 1, receiver (24) for on-board controller (20) is configured to receive wireless signals (18) having the signal format of the particular manufacturer's code. Controller (26) of control module (20) then conveys at least tire pressure information to a vehicle occupant via display (22).

In either embodiment, rather than being specially configured to operate in a particular TPM system, tire monitor (16) is universal. That is, tire monitor (16) has the ability to transmit wireless signal (18) according to any signal format, and can therefore be programmed to operate in any TPM system. In that same fashion, tire monitor (16) may be removed from a particular TPM system on a particular vehicle, and then re-initialized upon installation in a different TPM system on a different vehicle or vehicle platform.

Figure 3:
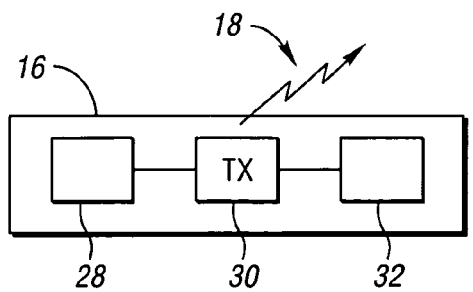
FIG. 3 is a simplified block diagram of another embodiment of the universal monitor for use in a vehicle remote tire pressure monitoring system according to the present invention.

Referring next to FIG. 3, another embodiment of the universal tire monitor of the present invention is shown, again denoted generally by reference numeral 16. Once again, the universal monitor (16) is for use in a remote tire pressure monitoring system (10) of the type shown in FIG. 1. Here again, according to the universal monitor (16) of the present invention, an appropriate sensor (28) and/or other device is provided, for sensing, determining and/or monitoring at least the pressure of the associated tire (14). Monitor (16) may again also be equipped to sense, determine and/or monitor any number of tire parameters in addition to pressure including, but not limited to, temperature, status (i.e., whether or not the tire is rotating) and/or speed, in any fashion known in the art.

A transmitter (TX) (30) is again provided in communication with sensor (28) for transmitting wireless signals (18) representative of the sensed tire pressure. Wireless signals (18) are again preferably radio frequency (RF) signals, although other signal types known in the art can be employed. It should be noted that wireless signals (18) may also include data representative of information concerning any of a number of other tire parameters such as temperature, status and/or speed as sensed, measured and/or determined by an appropriately equipped tire monitor (16).

A controller (32) is again provided in communication with transmitter (30). Controller (32) preferably comprises a microprocessor, which preferably includes a storage device or memory, such as a read-only memory (ROM) and/or any type of random access memory (RAM). Controller (32) is for storing a plurality of manufacturers' codes. As previously described, in existing TPM systems, manufacturers' codes may be used to identify a signal format including any number of characteristics, such as carrier frequency, modulation scheme, data format and/or encryption technique, for wireless signals (18).

In this embodiment, during operation of the TPM system, controller (32) controls transmitter (30) to transmit a series of wireless signals (18). Each one of the series of wireless signals (18) is transmitted by transmitter (30) according to the signal format indicated by a different one of the plurality of manufacturers' codes. In such a fashion, a wireless signal (18) is transmitted by transmitter (30) for every type of TPM system. With reference again to FIG. 1, the control module (20) on-board vehicle (12), including receiver (24), recognizes one of the series of wireless signals (18) from transmitter (30), which is used by controller (26) of control module (20) to convey at least tire pressure information to a vehicle occupant via display (22).

As is well known in the art, tire monitor (16) also includes a battery (not shown) in communication with and for providing power to transmitter (30). In this embodiment, transmission of a series of wireless signals (18) by transmitter (30) increases power consumption, thereby reducing the useful life of such a battery. However, since transmitter (30) transmits wireless signals (18) according to the signal formats for every type of TPM system, no receiver, remote transmitter or external interface is required as shown and described in conjunction with the embodiments of FIG. 2, thereby reducing the complexity of tire monitor (16).

Once again, rather than being specially configured to operate in a particular TPM system, tire monitor (16) is universal. That is, tire monitor (16) transmit wireless signals (18) according to a plurality of signal formats for every type of TPM system, and therefore operates in all TPM systems. In that same fashion, tire monitor (16) may be removed from a particular TPM system on a particular vehicle, and used in a different TPM system on a different vehicle or vehicle platform.

As is readily apparent from the foregoing description, the present invention provides a universal tire monitor for use in remote tire pressure monitoring systems. The universal monitor reduces the need for installers and aftermarket providers to stock multiple tire monitors configured for different TPM systems. Instead, such installers and providers can replace multiple monitors with a single monitor that can be used with multiple TPM systems. The universal monitor also reduces installation complexity since a single monitor and installation procedure can be used.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A universal monitor to be mounted in a tire of a vehicle, the monitor for use in a remote tire pressure monitoring system for the vehicle, the monitor comprising:
   a sensor for sensing tire pressure;
   a storage device for storing a plurality of codes, each code comprising at least a data format; and
   a transmitter in communication with the sensor and the storage device, the transmitter for transmitting a wireless signal including data representing the sensed tire pressure, wherein the wireless signal is transmitted by the transmitter according to at least one of the stored plurality of codes.

2. The monitor of claim 1 further comprising a receiver in communication with the storage device, the receiver for receiving a program signal for use in selecting one of the plurality of codes according to which the wireless signal is transmitted by the transmitter.

3. The monitor of claim 2 wherein the receiver comprises a port for receiving the program signal.

4. The monitor of claim 3 further comprising an external interface for connecting to the port and transmitting the program signal.

5. The monitor of claim 2 wherein the program signal has a low frequency, and the receiver comprises a low frequency receiver.

6. The monitor of claim 2 further comprising a remote transmitter for transmitting the program signal for receipt by the receiver.

7. The monitor of claim 6 wherein the program signal has a low frequency, the receiver comprises a low frequency receiver, and the remote transmitter comprises a low frequency transmitter.

8. The monitor of claim 1 wherein the wireless signal is transmitted by the transmitter according to each of the stored plurality of codes.

9. The monitor of claim 1 further comprising a receiver for mounting on the vehicle, the receiver for receiving the wireless signal transmitted by the transmitter, wherein the receiver is configured to recognize a wireless signal transmitted according to one of the plurality of codes.

10. The monitor of claim 2 further comprising a receiver for mounting on the vehicle, the receiver for receiving the wireless signal transmitted by the transmitter, wherein the receiver is configured to recognize a wireless signal transmitted according to one of the plurality of codes.

11. A universal monitor to be mounted in a tire of a vehicle, the monitor for use in a remote tire pressure monitoring system for the vehicle, the monitor comprising:
a sensor for sensing tire pressure;
a receiver for receiving a program signal, the program signal comprising one of a plurality of codes, each code comprising at least a data format; and
a transmitter in communication with the sensor and for transmitting a wireless signal including data representing the sensed tire pressure, wherein the wireless signal is transmitted according to the one of the plurality of codes received by the receiver.

12. The monitor of claim 11 further comprising a storage device in communication with the receiver and the transmitter, the storage device for storing the one of the plurality of codes received by the receiver.

13. The monitor of claim 11 wherein the program signal has a low frequency, and the receiver comprises a low frequency receiver.

14. The monitor of claim 11 further comprising a remote transmitter for transmitting the program signal for receipt by the receiver.

15. The monitor of claim 14 wherein the program signal has a low frequency, the receiver comprises a low frequency receiver, and the remote transmitter comprises a low frequency transmitter.

16. The monitor of claim 11 wherein the receiver comprises a port for receiving the program signal.

17. The monitor of claim 16 further comprising an external interface for connecting to the port and transmitting the program signal.

18. The monitor of claim 11 further comprising a receiver for mounting on the vehicle, the receiver for receiving the wireless signal transmitted by the transmitter, wherein the receiver is configured to recognize a wireless signal transmitted according to the one of the plurality of codes.

19. A universal monitor to be mounted in a tire of a vehicle, the monitor for use in a remote tire pressure monitoring system for the vehicle, the monitor comprising:
a sensor for sensing tire pressure;
a storage device for storing a plurality of codes, each code comprising at least a data format; and
a transmitter in communication with the sensor and the storage device, the transmitter for transmitting a series of wireless signals including data representing the sensed tire pressure, wherein each of the series of wireless signals is transmitted according to a different one of the stored plurality of codes.

20. The monitor of claim 19 further comprising a receiver for mounting on the vehicle, the receiver for receiving the series of wireless signals transmitted by the transmitter, wherein the receiver is configured to recognize one of the series of wireless signal transmitted according to one of the plurality of codes.

21. The monitor of claim 19 further comprising a receiver in communication with the storage device, the receiver for receiving a program signal for use in storing the plurality of codes.

22. The monitor of claim 21 wherein the receiver comprises a port for receiving the program signal.

23. The monitor of claim 22 further comprising an external interface for connecting to the port and transmitting the program signal.

24. The monitor of claim 21 wherein the program signal has a low frequency, and the receiver comprises a low frequency receiver.

25. The monitor of claim 21 further comprising a remote transmitter for transmitting the program signal for receipt by the receiver.

26. The monitor of claim 25 wherein the program signal has a low frequency, the receiver comprises a low frequency receiver, and the remote transmitter comprises a low frequency transmitter.

27. A monitor to be mounted in a tire of a vehicle, the monitor for use in a remote tire pressure monitoring system for the vehicle, the monitor comprising:
a sensor for sensing tire pressure;
a storage device for storing a plurality of codes, each code indicating at least a data format; and
a transmitter in communication with the sensor and the storage device, the transmitter for transmitting a wireless signal including data representing the sensed tire pressure, wherein the wireless signal transmitted by the transmitter has the data format indicated by one of the stored plurality of codes.

28. The monitor of claim 27 further comprising a receiver in communication with the storage device, the receiver for receiving a program signal for use in selecting one of the plurality of codes.

29. The monitor of claim 28 wherein the receiver comprises a port for receiving the program signal.

30. The monitor of claim 29 further comprising an external interface for connecting to the port and transmitting the program signal.

31. The monitor of claim 28 wherein the program signal has a low frequency, and the receiver comprises a low frequency receiver.

32. The monitor of claim 28 further comprising a remote transmitter for transmitting the program signal for receipt by the receiver.

33. The monitor of claim 32 wherein the program signal has a low frequency, the receiver comprises a low frequency receiver, and the remote transmitter comprises a low frequency transmitter.

34. The monitor of claim 27 wherein the wireless signal transmitted by the transmitter comprises a series of wireless signals, each wireless signal having the data format indicated by a different one of the stored plurality of codes.

35. The monitor of claim 27 further comprising a receiver for mounting on the vehicle, the receiver for receiving the wireless signal transmitted by the transmitter, wherein the receiver is configured to recognize a wireless signal having the data format indicated by one of the plurality of codes.

36. The monitor of claim 28 further comprising a receiver for mounting on the vehicle, the receiver for receiving the wireless signal transmitted by the transmitter, wherein the receiver is configured to recognize a wireless signal having the data format indicated by one of the plurality of codes.

37. A monitor to be mounted in a tire of a vehicle, the monitor for use in a remote tire pressure monitoring system for the vehicle, the monitor comprising:
- a sensor for sensing tire pressure;
- a receiver for receiving a program signal, the program signal comprising one of a plurality of codes, each code indicating at least a data format; and
- a transmitter in communication with the sensor and for transmitting a wireless signal including data representing the sensed tire pressure, wherein the wireless signal has the data format indicated by the one of the plurality of codes of the program signal received by the receiver.

38. The monitor of claim 37 further comprising a storage device in communication with the receiver and the transmitter, the storage device for storing the one of the plurality of codes of the program signal received by the receiver.

39. The monitor of claim 37 wherein the program signal has a low frequency, and the receiver comprises a low frequency receiver.

40. The monitor of claim 37 further comprising a remote transmitter for transmitting the program signal for receipt by the receiver.

41. The monitor of claim 40 wherein the program signal has a low frequency, the receiver comprises a low frequency receiver, and the remote transmitter comprises a low frequency transmitter.

42. The monitor of claim 37 wherein the receiver comprises a port for receiving the program signal.

43. The monitor of claim 42 further comprising an external interface for connecting to the port and transmitting the program signal.

44. The monitor of claim 37 further comprising a receiver for mounting on the vehicle, the receiver for receiving the wireless signal transmitted by the transmitter, wherein the receiver is configured to recognize a wireless signal having the data format indicated by the one of the plurality of codes.

45. A monitor to be mounted in a tire of a vehicle, the monitor for use in a remote tire pressure monitoring system for the vehicle, the monitor comprising:
- a sensor for sensing tire pressure;
- a storage device for storing a plurality of codes, each code indicating at least a data format; and
- a transmitter in communication with the sensor and the storage device, the transmitter for transmitting a series of wireless signals including data representing the sensed tire pressure, wherein each of the series of wireless signals transmitted has the data format indicated by a different one of the stored plurality of codes.

46. The monitor of claim 45 further comprising a receiver for mounting on the vehicle, the receiver for receiving the series of wireless signals transmitted by the transmitter, wherein the receiver is configured to recognize one of the series of wireless signal having the data format indicated by one of the plurality of codes.

47. The monitor of claim 45 further comprising a receiver in communication with the storage device, the receiver for receiving a program signal for use in storing the plurality of codes.

48. The monitor of claim 47 wherein the receiver comprises a port for receiving the program signal.

49. The monitor of claim 48 further comprising an external interface for connecting to the port and transmitting the program signal.

50. The monitor of claim 47 wherein the program signal has a low frequency, and the receiver comprises a low frequency receiver.

51. The monitor of claim 47 further comprising a remote transmitter for transmitting the program signal for receipt by the receiver.

52. The monitor of claim 51 wherein the program signal has a low frequency, the receiver comprises a low frequency receiver, and the remote transmitter comprises a low frequency transmitter.

* * * * *

UNITED STATES PATENT AND TRADEMARK OFFICE
CERTIFICATE OF CORRECTION

PATENT NO. : 7,518,495 B2  Page 1 of 1
APPLICATION NO. : 10/716121
DATED : April 14, 2009
INVENTOR(S) : Tom Tang et al.

It is certified that error appears in the above-identified patent and that said Letters Patent is hereby corrected as shown below:

Column 10, Line 19, Claim 46:

Delete "signal" and insert -- signals --.

Signed and Sealed this

Sixteenth Day of June, 2009

JOHN DOLL
*Acting Director of the United States Patent and Trademark Office*

(12) EX PARTE REEXAMINATION CERTIFICATE (10640th)
United States Patent
Tang et al.

(10) Number: US 7,518,495 C1
(45) Certificate Issued: Jun. 23, 2015

(54) UNIVERSAL TIRE PRESSURE MONITOR

(75) Inventors: Tom Tang, Novi, MI (US); John Nantz, Brighton, MI (US); Riad Ghabra, Dearborn Heights, MI (US); Thomas LeMense, Farmington, MI (US); Ronald King, Brownstown, MI (US); Jan Supronowicz, Dearborn, MI (US)

(73) Assignee: BARCLAYS BANK PLC, New York, NY (US)

Reexamination Request:
No. 90/013,222, May 19, 2014

Reexamination Certificate for:
Patent No.: 7,518,495
Issued: Apr. 14, 2009
Appl. No.: 10/716,121
Filed: Nov. 18, 2003

Certificate of Correction issued Jun. 16, 2009

(51) Int. Cl.
*B60C 23/04* (2006.01)

(52) U.S. Cl.
CPC ......... *B60C 23/0408* (2013.01); *B60C 23/0471* (2013.01)

(58) Field of Classification Search
None
See application file for complete search history.

(56) References Cited

To view the complete listing of prior art documents cited during the proceeding for Reexamination Control Number 90/013,222, please refer to the USPTO's public Patent Application Information Retrieval (PAIR) system under the Display References tab.

*Primary Examiner* — Behzad Peikari

(57) ABSTRACT

A universal monitor to be mounted in a tire of a vehicle, the monitor for use in a remote tire pressure monitoring system for the vehicle. The monitor includes a sensor for sensing tire pressure, and a storage device for storing a plurality of codes, each code comprising at least a data format. The monitor also includes a transmitter in communication with the sensor and the storage device, the transmitter for transmitting a wireless signal including data representing the sensed tire pressure. The wireless signal is transmitted by the transmitter according to at least one of the stored plurality of codes.

At the time of issuance and publication of this certificate, the patent remains subject to pending reexamination control number 95/002,268 filed Sep. 14, 2012. The claim content of the patent may be subsequently revised if a reexamination certificate issues from the reexamination proceeding.

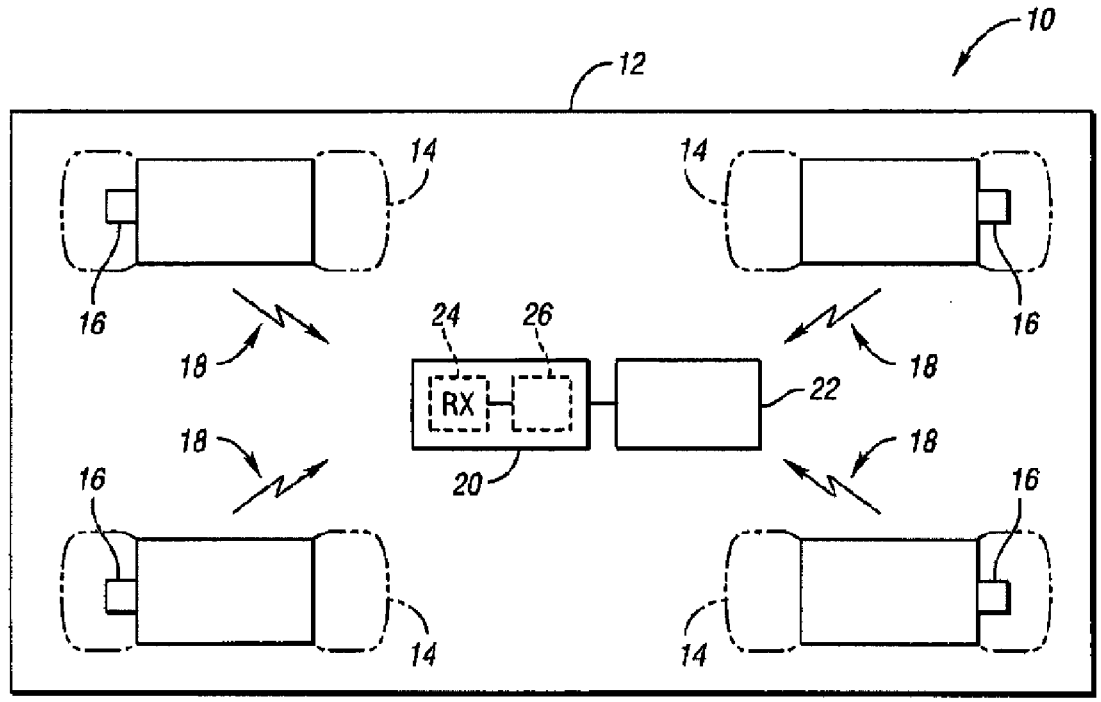

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-52 is confirmed.

\* \* \* \* \*